(12) United States Patent
Regelsberger et al.

(10) Patent No.: US 6,611,666 B2
(45) Date of Patent: Aug. 26, 2003

(54) DENSITOMETER WITH IMPROVED ACCURACY FOR USE IN COLOR IMAGE PROCESSING APPARATUS

(75) Inventors: Matthias H. Regelsberger, Rochester, NY (US); Richard G. Allen, Rochester, NY (US); William A. Hameister, deceased, late of Penfield, NY (US), by Laura J. Hameister, executrix; Bradley A. Twait, Rochester, NY (US)

(73) Assignee: Nexpress Solutions LLC, Rochester, NY (US)

( * ) Notice: Subject to any disclaimer, the term of this patent is extended or adjusted under 35 U.S.C. 154(b) by 0 days.

(21) Appl. No.: 09/882,196

(22) Filed: Jun. 15, 2001

(65) Prior Publication Data

US 2003/0007804 A1 Jan. 9, 2003

(51) Int. Cl.[7] ............................................. G03G 15/00
(52) U.S. Cl. ........................................................ 399/74
(58) Field of Search ............................................ 399/74

(56) References Cited

U.S. PATENT DOCUMENTS

| 4,799,082 A | * | 1/1989 | Suzuki | ........................ 399/41 |
|---|---|---|---|---|
| 5,325,153 A | | 6/1994 | Mitsuse et al. | ............. 355/203 |
| 5,583,644 A | | 12/1996 | Sasanuma et al. | .......... 358/296 |
| 5,842,080 A | | 11/1998 | Ashibe et al. | ................ 399/49 |
| 5,854,680 A | | 12/1998 | Rakitsch | ...................... 356/406 |
| 5,903,800 A | | 5/1999 | Stern et al. | .................... 399/74 |
| 6,055,011 A | | 4/2000 | Nishimura | .................. 347/254 |

\* cited by examiner

Primary Examiner—Quana M. Grainger

(57) ABSTRACT

A method and apparatus for a single densitometer design that is used for all colors within multiple color image processing system. The preferred embodiment employs an LED having a light adjustment mechanism for controlling the amount of light received by a light detector in the densitometer. The coarse light adjustment is provided through a variable aperture. Fine light adjustment is accomplished through controlling the current through the LED, either by a potentiometer or through an automated process. Preferably, each of the LEDs is selected by wavelength to maximize the absorption by the colorant yielding light roughly complimentary to the colorant. The adjustment circuit provides advantage in color printing systems by allowing duplicate versions of the same densitometer circuit to yield similar voltage outputs for different colorants, thereby compensating for different absorption characteristics and light output of different colored LEDs.

37 Claims, 8 Drawing Sheets

ILLUMINATION ACCORDING TO THIS DISCLOSURE WITH APERTURE AND LIGHT OUTPUT CONTROL $V_{CONTROL}$ PROVIDED BY A COMPUTER.

DENSITOMETER WITH IMPROVED ACCURACY FOR USE IN COLOR IMAGE PROCESSING APPARATUS

BACKGROUND OF THE INVENTION

1. Field of the Invention

This present invention relates to multiple-color image processing using inks or dry toners and, more specifically, to controlling the amount of ink or dry toner used in forming the image on a receiver.

2. Description Relative to the Prior Art

Conventional electrophotographic process steps employed within image processing equipment are known to employ light-emitting and light detection devices to measure of the amount of toner used in image formation (e.g., U.S. Pat. Nos. 5,325,153; 5,583,644; 5,842,080; and 6,055,011). Similarly, conventional printing processes used in image processing equipment are known to employ light-emitting and detection devices to measure the amount of inks used in the image formation (e.g., U.S. Pat. No. 5,854,680). The foregoing prior art references utilize light-emitting diodes (LEDs) in conjunction with photocells to quantify the amount of dry toner or ink used by measuring the amount of light reflected by image test patches. Specific attention is given to the very different light absorption and reflection characteristics of black vs. colored toner when illuminated with near infrared light. The use of other light sources, such as colored LEDs, is considered inferior due to higher cost and increased complexity in implementation (U.S. Pat. No. 6,055,011). Furthermore, in using reflected light to measure the quantity of dry toner or ink, the optical properties of the surface underneath have to be taken into consideration. These considerations might include the manufacture of intermediate transfer rollers with certain preferred optical characteristics (U.S. Pat. No. 5,842,080), switching of the illumination intensity to improve the signal-to-noise ratio (U.S. Pat. No. 5,325,153), or arranging image sample patches in support of a preferred measurement procedure (U.S. Pat. No. 5,854,680) and sequence.

Other disclosures within the prior art teach the use of light transmission through image test patches to measure the amount of colorant used in the image formation process. Such arrangements are described in JP-B 4-18310 (as referenced in U.S. Pat. No. 5,842,080, the original was not available to the authors) and in U.S. Pat. No. 5,903,800.

The previously discussed prior art disclosures measure the amount of toner used in the image formation process as an integral part of the image processing apparatus. Such measurements are used to derive control signals for the purpose of automatically adjusting the operating setpoints of the printing process itself so that printing quality is maintained and consistent over a large range of operating conditions and over long periods of print production.

It should be apparent from the foregoing discussion that there remains a need within the art for an apparatus that can control the amount of colorants used in image formation. It is desirable that amount of colorants used remain constant despite changes in (a) print productivity, (b) environmental condition, (c) lifetime fatigue of consumables, or (d) malfunctioning of components. It will be readily apparent that the last two areas can be somewhat controlled and considered in the design and manufacturing process of the image processing equipment. Environmental conditions and productivity of the image processing apparatus in the customer site are beyond the control of the manufacturer.

Accordingly, there exists the need within the art for image processing apparatus that have the capability of adjusting operating parameters automatically, such that image quality produced on the receiver is, at all times, within the manufacturer's stated specifications and stable over extended periods of time.

SUMMARY OF THE INVENTION

The present invention addresses the previously discussed problems within the prior art by controlling the image processing apparatus to ensure that the amount of colorants used in the image formation remains constant despite changes in lifetime fatigue of consumables and malfunctioning of components. The hardware components and methods according to this invention are particularly suited to be implemented in conjunction with a multicolor printing process utilizing an endless loop for either the purpose of recording the image or transporting the image receiver.

According to one aspect of the present invention, light-emitting and light-detecting devices are mounted in a facing relationship such that they are, respectively, on the inside and the outside of the endless loop. The light-emitting device will emit light through a test patch on the receiver into the light-detecting device at various levels, depending on the density of colorant used in the test patch or within the image on the receiver. Furthermore, the light-emitting devices employed by the present invention are selected to emit colored light of a wavelength within the absorption spectrum of the colorants used in the printing process that is roughly complementary in color to the colorants used in the patch to be tested. The image processing apparatus creates image test patches that are arranged such that light, complimentary to the colorant forming the image test patch, is transmitted through test patch and received by the light-detecting device prior to being used in making measurements. The measurements made in this fashion are superior to those made by prior art devices. The light-emitting and the light-detecting device for each of the colors amount of the transmitted light that is absorbed increases, yielding qualitatively similar characteristics for all four colorants in contrast to prior art. Accordingly, the detecting devices for all four colorants show a similar exponential loss in intensity as the density of the colorant increases. This similar data received for each colorant is processed identically in contradistinction to the prior art techniques shown in U.S. Patent Nos. 6,055,011 and 5,325,153.

The selection of LEDs that are roughly complimentary to the colorants maximizes the signal for each colorant and, thus, also allows the measurement of colorant density on the image receiver after transfer of the image. Observations have shown that infrared illumination of colorants through the receiver (such as paper) produces measurable signals proportional to the amount of black colorant. The other three colorants are indistinguishable from each other and yield no measurable signal as a result of infrared stimulation to an image on most paper-like receivers.

The present invention provides a system that uses of the same detection circuit for each of the colors with the only difference being the color of the LED used for each of the specific colors at the color sensing point. The use of an identical circuit is a desirable feature of the present invention because it reduces the manufacturing cost of the multicolor image processing apparatus. Also, in accordance with another aspect of the present invention, the absorption characteristics for all colorants will be the same by employing the same detection circuits normalized to a specific color.

Additionally, a similar mechanical arrangement is used to illuminate the receiver at each of the color sensing points.

Furthermore and, in accordance with the present invention, the light-emitting devices for each of the colorants is modified to an individualized fixed and predetermined aperture. Furthermore, the light-emitting devices for each of the colorants includes the provision of allowing the adjustment of the maximum light output by adjusting the electrical current that flows through the light emitting diode (LED) used as the light-emitting device. According to the present invention, the optical aperture and maximum light output of the illumination are selected to produce a signal of similar amplitude in the light detection circuit for each of the sensing points. By making these modifications to the illumination, the absolute value and the dynamic range of the electrical signal that is derived from and is proportional to the detected light are essentially equal and independent of colorant. The light detection circuit typically includes circuitry to perform a logarithm operation on the input signal. Such an operation can be performed by a special analog device such as a Logarithmic Amplifier (e.g., Burr-Brown Log100JP), or digital devices that can be programmed to provide this function (such as microprocessors programmed accordingly to perform the logarithmic function).

It should be noted that the modifications to the illumination, in accordance with this disclosure, produce voltages similar in magnitude for similar densities of colorants.

It is another aspect of this invention to describe details of the electronic circuit of the light detection circuitry intended to protect the measuring circuitry incorporated in typical image processing equipment.

It is another aspect of this invention that the light intensity regulation provided according to the above is used in the operation and calibration of this device. The methods described for operation of the device and calibration of the device is incorporated into the controller of the image processing apparatus. The seamless integration of these methods into software governing the print production mode and the service mode yield the desired consistency in print quality over an extended range of operating conditions.

BRIEF DESCRIPTION OF THE DRAWINGS

The invention and its objects and advantages will become apparent upon reading the following detailed description and upon reference to the drawings, in which.

DETAILED DESCRIPTION OF THE PREFERRED EMBODIMENTS

The present invention provides hardware components, and the associated methods for their operation, that are particularly suited to be implemented in a multicolor printing process. The preferred embodiment of the invention utilizes an endless loop for recording the image, or transporting an image receiver on the endless loop. However, it is envisioned that other embodiments can also employ the components and methods of the present invention. Although the description of the preferred embodiments that follow are particularly suited for color printing, the present invention is also applicable to monochrome printing devices and methods.

Figure 1:
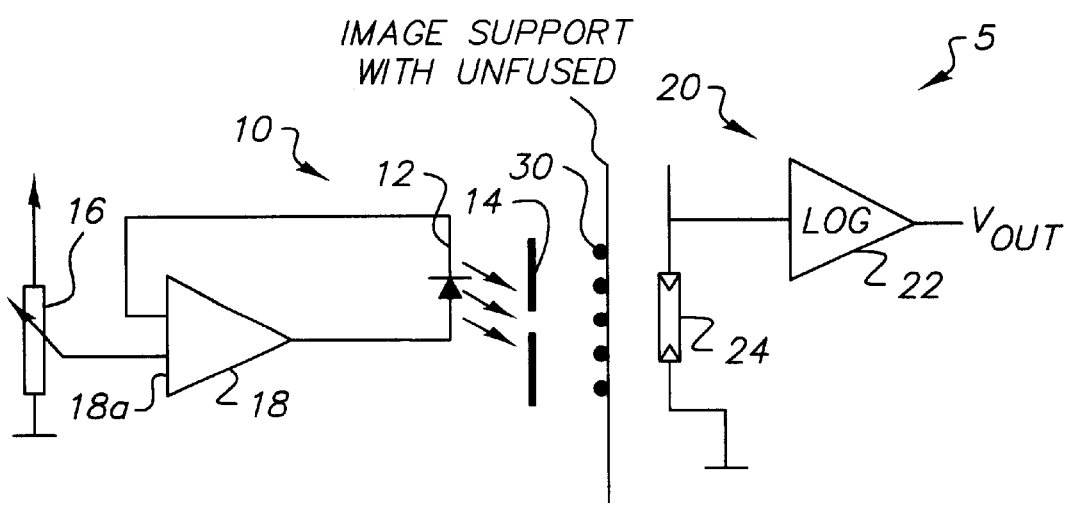
FIG. 1 is a schematic diagram of the densitometer envisioned by the present invention.

FIG. 1 is a schematic diagram of the densitometer, generally referred to as 5, as envisioned by the present invention. According to the present invention, light-emitting 12 and light-detecting 24 devices are mounted in facing relationship on the inside and the outside of an endless loop as shown in FIG. 1. The light-emitting device 12, as envisioned by the preferred embodiment of the present invention, emits light that is selected to maximize the absorption for each colorant used in the printing process. Such light is roughly complementary to the colorant used. The image processing apparatus creates image test patches arranged such that light, typically complimentary to the colorant forming the image test patch, is transmitted through the test patch and used in making measurements according to Table 1 below. Measurements made in this fashion have been found by the present invention to be superior to those measurements made using the procedures according to the prior art, such as reflection of light from test patches using either the same or complementary illumination. As the density of the colorants increase, the amount of the transmitted light that is absorbed increases, yielding qualitatively similar characteristics for all four colorants in contrast to prior art. Accordingly, the detecting devices for all four colorants show a similar exponential loss in intensity as the density of the colorant increases. This similar data received for each colorant is processed identically in contradistinction to the prior art techniques shown in U.S. Pat. Nos. 6,055,011 and 5,325,153.

TABLE 1

| Colorant of Image Test Patch | Color of Illumination |
|---|---|
| BLACK | Infra-red (IR) |
| YELLOW | Blue |
| MAGENTA | Green |
| CYAN | Red |

The light-emitting device 12, as envisioned by the preferred embodiment of the present invention, emits light that is selected to maximize the absorption for each colorant used in the printing process. Such light is roughly complimentary to the colorant used. The image processing apparatus creates image test patches arranged such that light, typically complimentary to the colorant to allow the measurement of colorant density on the image receiver after transfer of the image. Observations have shown that infrared illumination of colorants through the receiver (such as paper) produces measurable signals proportional to the amount of black colorant. The other three colorants are indistinguishable from each other and yield no measurable signal in presence of most paper-like receivers as a result of infrared stimulation.

FIG. 1 is a schematic drawing of a light emitting section 10 and a light-detecting section 20 for a densitometer 5 as envisioned by the present invention. The design as seen in FIG. 1 allows use of the same circuit at each sensing point within a system. The use of the same detection circuit for each of the sensing points is desirable because it reduces the manufacturing cost of the multicolor image processing apparatus. It is another aspect of the present invention that the absorption characteristics for all colorants will be the same by employing the same detection circuit, as previously described, with a similar mechanical arrangement used to illuminate the receiver.

In accordance with the present invention, as envisioned for the multicolor image processing apparatus, the light emitting sections 10 for each of the colorants are modified to have different fixed, predetermined apertures 14. The light-emitting sections 10 also allow for adjustment of the current through the light-emitting devices 12, resulting in varying the amount of light output. The light-emitting devices 12 within the preferred embodiment are LEDs that can have current adjustment accomplished through a potentiometer 16 or through an automated control process (see FIG. 4). According to the present invention, the optical aperture and maximum light output of the illumination are selected to produce a signal of similar amplitude in the light detection section 20 for all illumination sources. With these modifications to the illumination, the absolute value and the dynamic range of the electrical signal proportional to detected light are essentially equal and independent of colorant. The light detection section 20 typically includes circuitry to perform a logarithm-operation on the input signal by a logarithmic amplifier 22. The logarithmic operation of logarithmic amplifier 22 can be performed by specialized analog devices (such as a. Burr-Brown Log100JP), or digital devices (such as microprocessors programmed accordingly). The amplitude of the output signal $V_{out}$ of such light detection section 20 can be expressed by $V_{out}=k*\log(I_{light}/I_{ref})$. Conventionally, in image processing apparatus two light intensity measurements are performed, one without any colorant, a second in presence of colorant, to quantify the amount of colorant accurately without the error introduced otherwise by the support. The amount of colorant measured, M, is then determined by the difference of the two voltage measurements as shown by the relationship of Equation 1.

$$M=g*\Delta V=g*(V_2-V_1)=g*k[\log(I_{colorant}/I_{ref})-\log(I_{support}/I_{ref})]$$  Equation 1

The modifications made to the illumination, in accordance with the present invention, produce voltages $V_1$ and $V_2$ that are similar in magnitude for similar densities of colorants. Analogous, the constants g and k are similar, but not identical in value for each of the colorants.

The following tables are used to illustrate the advantages of various implementations according to the present invention. Using the colored LEDs, as shown in Table 2, the absorption characteristics of colorants used in an electrophotographic printing process are tabulated in Table 3. The absorption characteristic, according to the present invention, is measured with a light detection circuit and given as an output voltage of the detection circuit which, as previously stated, produces an output voltage according to $V_{out}=k*\log(I_{light}/I_{ref})$ The values listed in Tables 3 are the voltage differences $\Delta V=V_2-V_1$, as defined by Equation 1. For the devices used in Table 3, the constant k was negative. Therefore, the voltages given are directly proportional to the amount of light absorbed by the colorant. Please note that the selection of the illumination according to this invention (see Table 1) produces the highest readings and, thus, produces the highest sensitivity with regard to the amount of colorant. For this reason, the preferred embodiment selects illumination according to Table 1.

Referring to Table 3, it will be apparent that alternate embodiments to a four-color multiple light emitter embodiment of Table 1 are possible. Table 3 illustrates the capability of unfused colorants cyan, magenta and yellow, as well as black, to absorb light of different wavelengths. From Table 3, it is also envisioned that two light emitters can be used to create alternative embodiments by selecting the light emitter colors from Table 3, such that they have a maximum $\Delta V$ sufficient to be considered comparable to the four-color light emitter version of the preferred embodiment. As seen in Table 3, an embodiment employing green and blue LEDs would provide sufficient sensitivity for cyan, magenta, yellow and black to process these colorants. Also, an embodiment employing blue and yellow LEDs would provide sufficient sensitivity to process cyan, magenta, yellow and black colorants. These alternate embodiments are similar in sensitivity to the three LED preferred embodiment. It should also be noted that Table 3 illustrates the problems that exist in sensing infrared. This is a common problem within the prior art, namely that the three chromatic colorants cyan, magenta and yellow, show very little capability in absorbing infrared light.

TABLE 2

LED's Used for Data Shown in Table 3

|  | QT Optoelectronics | F5D1 | 880 nm |
|---|---|---|---|
| Infrared |  |  |  |
| Red | Radio Shack | 276–307 | 660 nm |
| Green | Radio Shack | 276–304 | 565 nm |
| Blue | Nichia | NSPB520S | 470 nm |
| Yellow | Radio Shack | 276–301 | 585 nm |

TABLE 3

Capability of Unfused Colorant to Absorb Light

|  | CYAN | MAGENTA | YELLOW | BLACK |
|---|---|---|---|---|
| Infrared | 0.19 | 0.19 | 0.26 | 0.58 |
| Red | 0.60 | 0.18 | 0.17 | 0.59 |
| Green | 0.53 | 0.38 | 0.19 | 0.62 |
| Blue | 0.28 | 0.35 | 0.42 | 0.59 |
| Yellow | 0.64 | 0.33 | 0.20 | 0.65 |

According to the preferred embodiment, the output of light-emitting device 12 and the specifics to aperture 14 are selected to yield similar voltage readings for $V_1$ and $V_2$. For the best comparison, the readings in Table 3 were generated using one and the same aperture. The densities of the sample patches used in Table 3 are given in Table 4 and are typical for forming maximum density images for each colorant. It is well known that the light output as a function of current for different colored LED's is rather different. In addition, the maximum allowed current for each LED is very different from color to color and determined by its manufacturing process. To compensate for these differences among the different illuminations, the aperture is selected such that all four illuminations produce roughly the same voltage $V_{out}$ at the output of the light detection circuit when there is no colorant present.

With the aperture selected, the light output of each illumination is adjusted to obtain essentially identical readings $V_{out}$. Therefore, the aperture selection represents a coarse adjustment of the light output compensating largely for different manufacturing processes (maximum current, efficiency) among the color LEDs, whereas the light output adjustment represents a fine adjustment of the light output compensating for variations in the manufacturing process of LEDs of one color.

The schematic diagram in FIG. 1 illustrates the principle of the present invention with light-emitting section 10 and light-detecting section 20. Light-emitting section 10, as envisioned by the preferred embodiment, comprises LED 12, which is oriented to emit light through aperture 14. Aperture 14 is configured, as previously discussed. A current control mechanism 16 works in conjunction with operational amplifier 18 to vary the current the flows through LED 12. Image receiver 30 is situated with respect to aperture 14 such that light passing through aperture 14 is incident on the image receiver 30. The amount of light that passes through image receiver 30 can be detected by the light-receiving section 20. According to the present invention, a fine adjustment to the illumination of light-emitting section 10 is obtained by using current control mechanism 16 to vary the voltage the input to operational amplifier 18. As seen in FIG. 1, control input 18a to operational amplifier 18 has its voltage level controlled by a potentiometer as current control mechanism 16.

Figure 4:
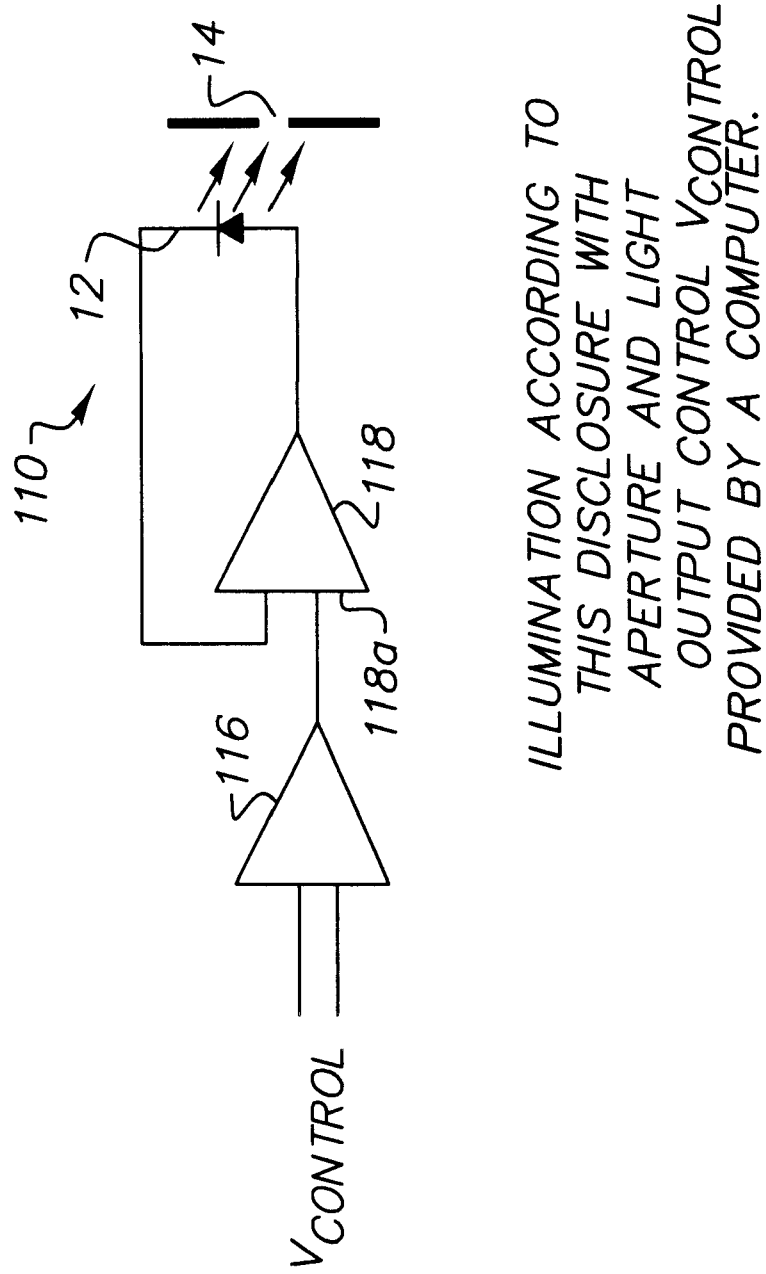
FIG. 4 is an automated version of the light emitter shown in FIG. 1.

Referring to FIG. 4, the preferred embodiment of the light-emitting section 110 is illustrated having the same LED 12, aperture 14 and, functionally, the same operational amplifier 118. The control input 118a to operational amplifier 118 is controlled by an operational amplifier 116 which is used as a buffer to forward the control voltage to the control input 118a of current-sourcing operational amplifier 118. This adjustment is provided by control a voltage generated by a digital-to-analog converter (not shown) that is an integral part of the logic and control unit of the image processing apparatus. This provides an automated method of control for the fine tuning of light-emitting section 10.

Within the light-receiving section 20, light from LED 12 that passes through the image receiver 30 is received by light detector 24 and converted into a signal that is applied to the input of logarithmic amplifier 22. Within the preferred embodiment, light detector 24 is a photocell device that acts as a light-sensitive resistor and generates a voltage at the input of logarithmic amplifier 22. It is also envisioned that other technologies besides photocells can be used for light detector 24.

Table 4 summarizes the densitometer readings obtained with a commercially available transmission densitometer on the image test patches used in Table 3 after fusing. The amount of colorants used in the image test patches represents closely the amount of colorants used in an electrophotographic printing process to form images of about maximum density.

TABLE 4

|  | CYAN | MAGENTA | YELLOW | BLACK |
| --- | --- | --- | --- | --- |
| Red | 1.03 | 0.05 | −0.02 | 1.02 |
| Green | 0.32 | 1.15 | 0.00 | 0.97 |
| Blue | 0.10 | 0.48 | 0.88 | 1.04 |
| Visual | 0.70 | 0.49 | −0.01 | 1.02 |

Figure 2A:
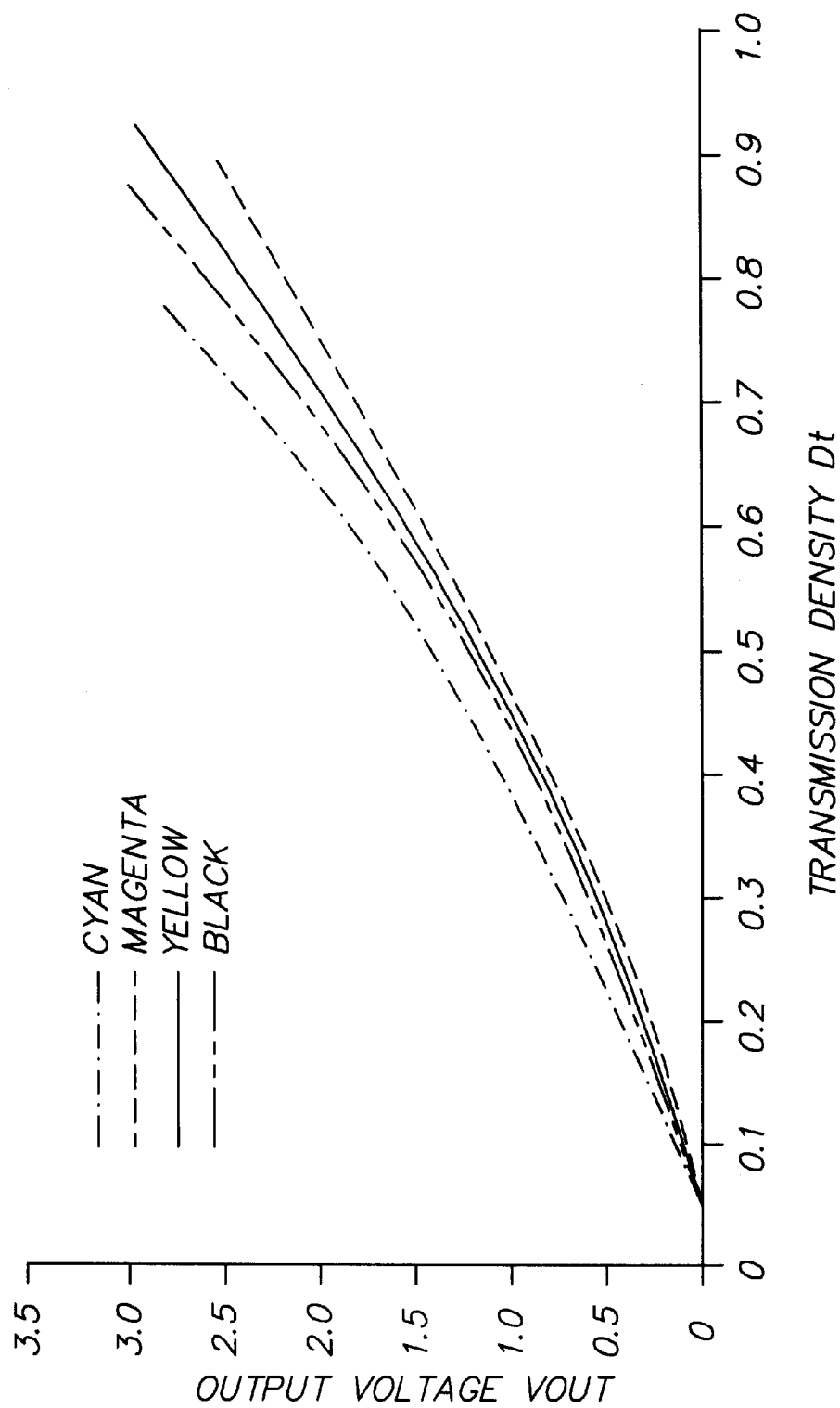
FIG. 2a is a chart of the of the output characteristics of light detectors as a function of transmission density.
Figure 2B:
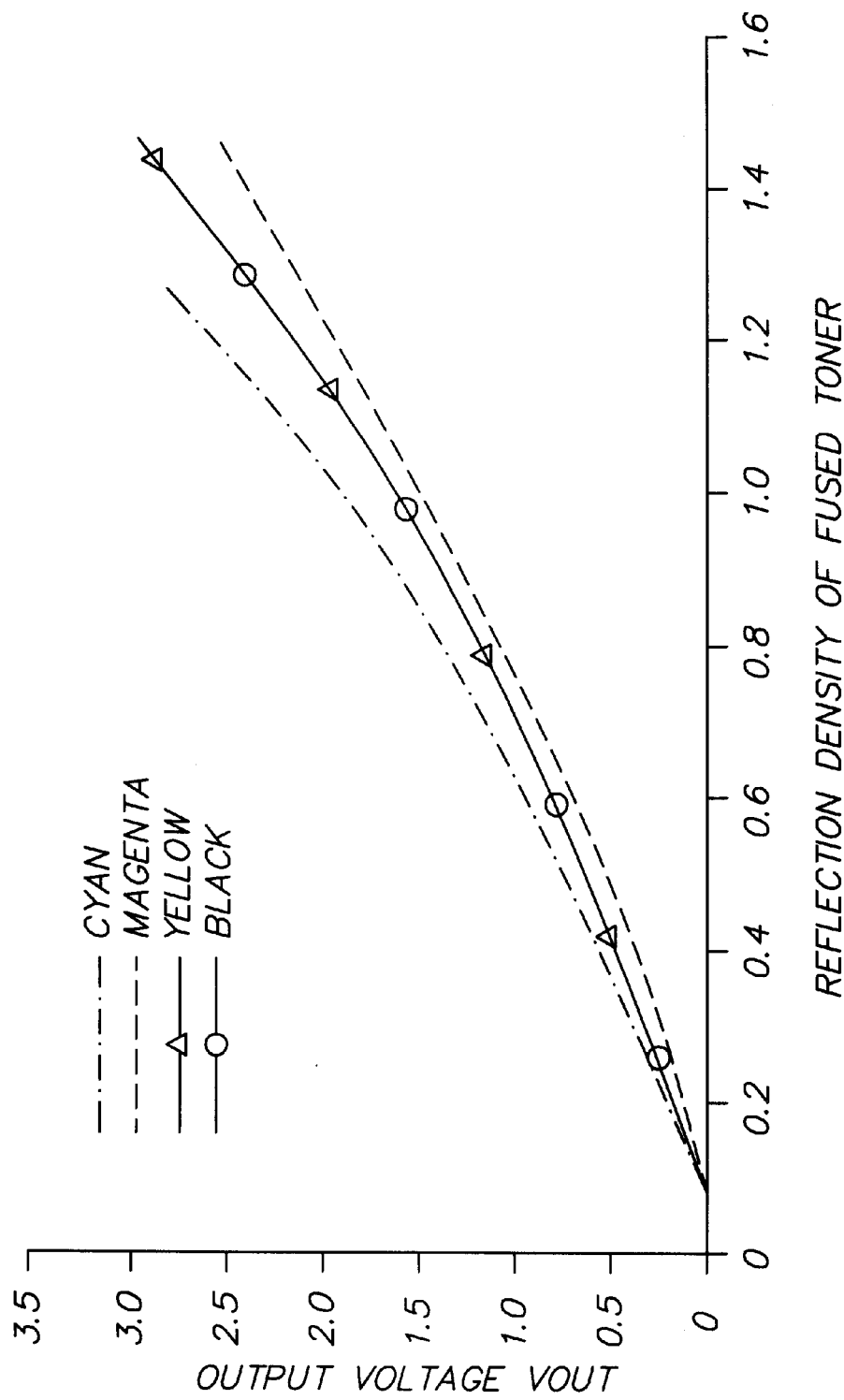
FIG. 2b is a chart of the of the output characteristics of light detectors as a function of reflection density.

Referring to FIGS. 2a and 2b, which are light detector characteristics of transmission and reflection densities, respectively, the output voltage of the light detection circuit performs a logarithmic function that yields similar characteristics for each of the four colorants. With the illumination from the configuration, as prepared and modified according to preferred embodiment of the present invention, the light detector output characteristics shown in FIGS. 2a and 2b are typical. It is clearly evident from FIGS. 2a and 2b that the illumination provided, as modified according to the teachings of the present invention, result in light detection that is similar for all four colorants. FIG. 2a illustrates the output characteristics of the light detector as a function of transmission density, wherein the transmission density (x-axis) is measured with a commercially available densitometer. FIG. 2b illustrates the output characteristics of the light detector as a function of reflection density, wherein the reflection density (x-axis) is measured with a commercially available densitometer.

In accordance with the preferred embodiment of the present invention, the output voltage of the light-detecting section 20 is related to the light sensed by the light detector 24 by a logarithmic function, as defined by the logarithmic amplifier 22. Such a relationship can be achieved by special integrated circuits, e.g., log-amplifiers produced by Burr Brown. However, it is also envisioned that a computational element, such as a microprocessor, can alternatively be employed to perform the logarithmic function. Such computational elements typically convert the analog signal from light detector 24 to a digital signal, processing it by implementation of a logarithmic algorithm, calculating the logarithm and converting the result back to an analog voltage. Alternatively, the signal generated by light detector 24 can be converted into a digital word which can be used to address a Look Up Table which will, in turn, output data corresponding to a logarithmic function from the addressed memory cells within the Look Up Table. In any event, the use of a logarithmic function generator is preferred because human perception is logarithmic. There is a problem that exists using logarithmic functions in that these functions result in asymptotic outputs that, electronically, can cause problems to circuits that use the asymptotic outputs as inputs. Therefore, there exists a problem that requires special attention in order to prevent stages within the electrical circuitry following the logarithmic function from being damaged by these signals having asymptotic characteristics.

As previously stated, the output, $V_{out}$, of the light-detecting section is given by the relation $V_{out}=k*\log(I_{light}/I_{ref})$. The output voltage of the light-detecting section 20 is typically input to an analog-to-digital (A/D) converter 40. The output of the light-emitting section 20 will be one of several inputs to an analog multiplexer (not shown) with the other inputs to the analog multiplexer being different analog sensor signals from other components of the printing apparatus (e.g., such as an electrometer input). The A/D converter 40 is an integral part of the logic and control unit of the image processing apparatus. Different A/D converters will have varied parameters in accordance with their design features. Among these various types of A/D converters, are those having a limited range of input voltages such as bipolar A/D converters, which typically have a −10 to +10 voltage range. Another type of A/D converter is a unipolar A/D converter, which can have a voltage range of 0 to +10 volts. Here, it is readily apparent that the range for bi-polar and unipolar A/D converters is limited. This limited input range is in contrast with the infinitely high and low limit characteristics of the logarithmic amplifier 22. The logarithmic amplifier 22 will produce asymptotic outputs that are inherent in the logarithmic function that it performs. Therefore, the minimum and maximum output voltages from the logarithmic amplifier 22 will logarithmically convert input signals to levels that are, respectively, below and above the input range for the A/D converters. These minimum and maximum logarithmic amplifier 22 output voltages are usually the supply voltages of the logarithmic-amplifier 22. If these minimum and maximum output voltages, $V_{out}$, are in excess of the input voltage range for the analog-to-digital converter, malfunction and/or damage to the multiplexer and A/D-converter 40 is likely. Therefore, there is a need to protect the electronics (such as the multiplexer and the A/D converter 40) from voltage swings resulting in over-voltage and under-voltage conditions that can result in inaccurate readings or even a completely unavailable densitometer reading.

In the preferred embodiment, logarithmic-amplifier 22 has a negative k and was chosen to work in conjunction with a unipolar A/D converter 40 (part of the logic and control unit). The input range of the unipolar analog-to-digital converter 40 is typically 0 to +10 volts. The light output of the emitter is adjusted using the coarse adjust (the aperture) and the fine adjust (the current setting) to yield a slightly positive voltage for the input of the A/D-converter 40. With increasing amounts of colorant, less light will be sensed by the light-detecting section 20 and the output voltage, $V_{out}$, will increase such that a maximum of about 10 volts will result at a colorant density of about 2.5. With the operating characteristics of the light-detecting section 20 selected, as just stated, there exists a need to protect the A/D converter 40 from input voltages that are smaller than zero.

Figure 3A:
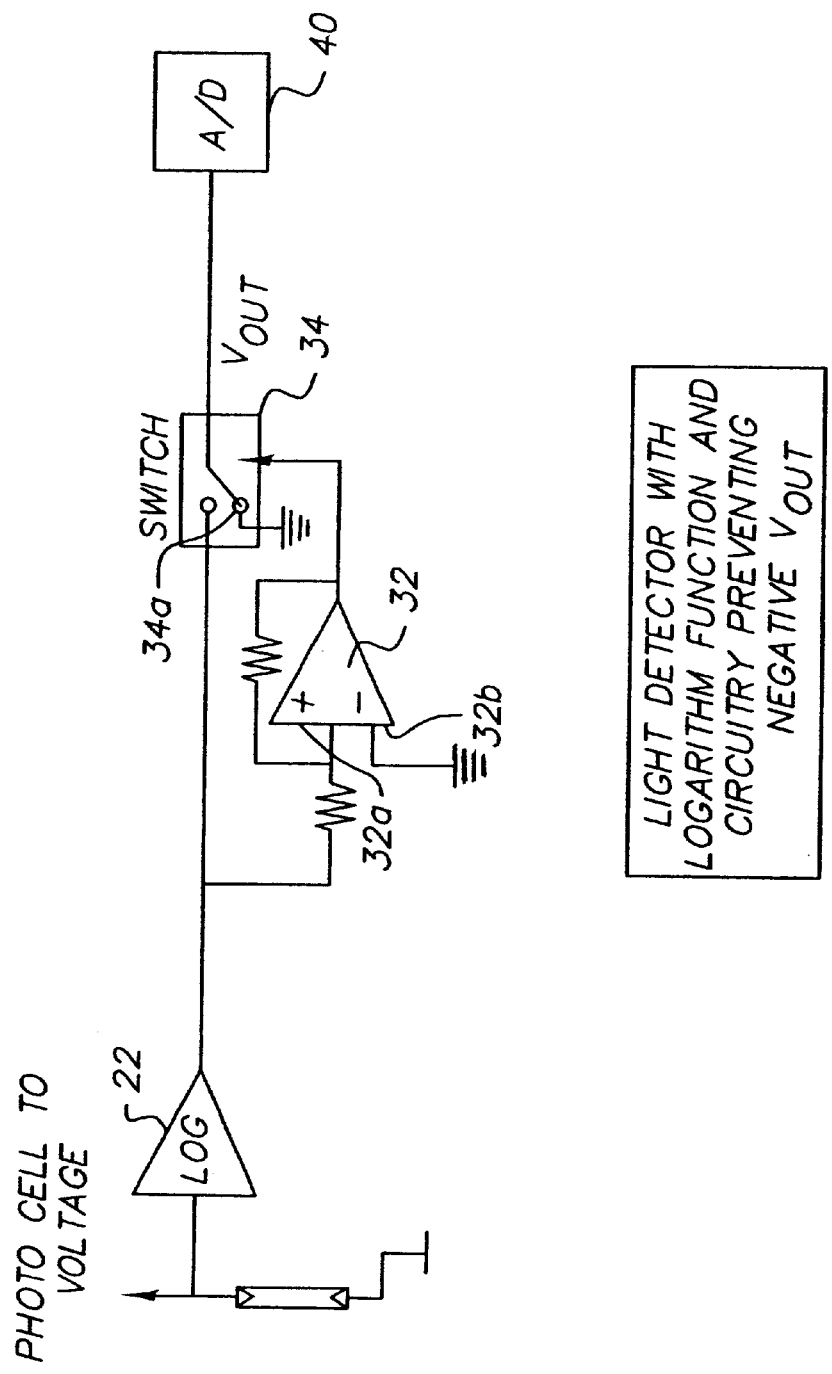
FIG. 3a is a schematic diagram of the output voltage protection circuit as envisioned by the present invention.

FIG. 3a is an electrical circuit diagram illustrating the preferred embodiment for preventing a single threshold voltage from being exceeded. As discussed above, when a unipolar logarithmic amplifier is employed, the concern of the present invention is that of negative output voltages, $V_{out}$, being forwarded to the A/D converter 40. In order to prevent the occurrence of unwanted voltages from reaching the A/D converter 40, comparator 32 has an input that is set to a predetermined voltage level that operates as a threshold that is not to be exceeded. If the level of $V_{out}$ reaches that threshold, the comparator 32 produces a signal that toggles switch 34 and disengages the $V_{out}$ signal from the A/D converter 40. The preferred embodiment envisions as switch 34, an AG412 semiconductor switch made by Analog Devices®. It is also envisioned that alternate designs can employ different components as switch 34, such as a transistor configuration. There are basic requirements for switch 34, such that it can be activated by an operational amplifier within the comparator 34 configuration and that the switching operation is sufficiently fast. Within the preferred embodiment of the invention, switch 34 will also provide a connection to an alternate position 34a that is the same potential used to activate switch 34. It is also envisioned that this potential be a common voltage used on many of the electrical components. The effect of switch 34 on $V_{out}$ is that it effectively clamps the level of $V_{out}$ to a level that does not exceed the desired threshold level that is placed on the comparator and prevents voltage levels that are of undesired levels to be placed at the input of the A/D converter 40. The case shown in FIG. 3a is for a unipolar logarithmic amplifier 22 where the main concern, in accordance with the teachings of the invention, are negative voltages. Therefore, the primary concern is that the threshold that not be exceeded in the circuit shown in FIG. 3a is zero volts and that voltages that are less than zero volts will be exceeding this threshold. It should also be understood that the threshold for the circuit of FIG. 3a could be set for over-voltage protection. Here, the threshold would be a positive voltage. The present invention envisions 10 volts as the positive threshold, and a voltage above the 10-volt threshold would be exceeding the threshold, causing the triggering of switch 34.

Figure 3B:
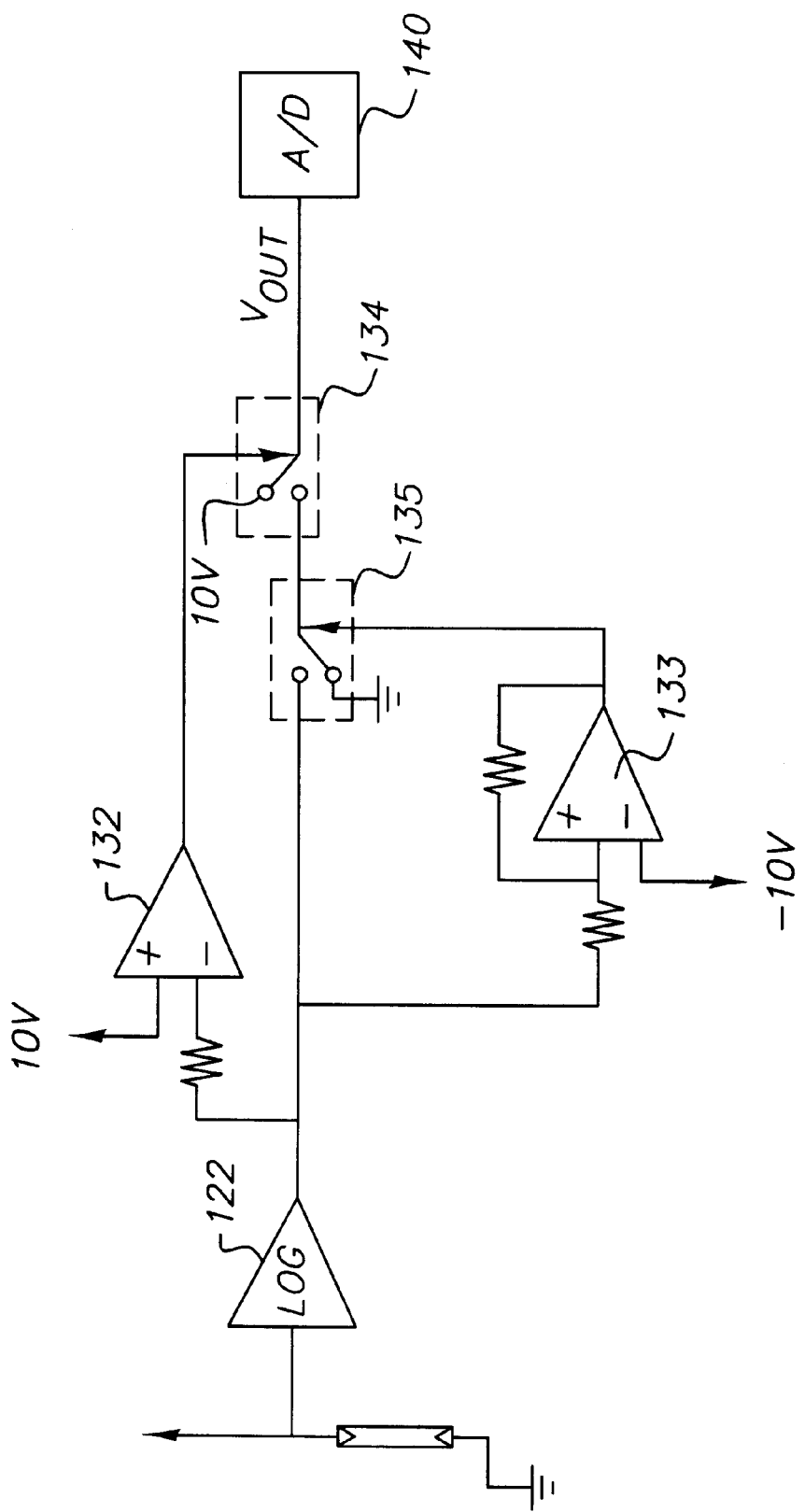
FIG. 3b is a schematic diagram of the output voltage protection circuit to insure voltages within a predetermined range as envisioned by the present invention.

FIG. 3b is an electrical circuit illustrating the preferred embodiment when a bipolar A/D converter 140 requires the prevention of output voltages, $V_{out}$, that are out of the necessary range from being forwarded to the A/D converter 40. The A/D converter 140 as a bipolar is envisioned to typically have a range of −10 to +10 volts. Therefore, the circuit is similar to that illustrated in FIG. 3a with the basic difference being that there are two comparators, 132, 133 and two switches 134, 135. As shown in FIG. 3b, the comparator 132 circuit provides a comparison voltage of 10 volts which, when exceeded, will activate switch 134 to disengage the output from logarithmic amplifier 122 and throw to a pole having a 10-volt reference voltage which will effectively clamp $V_{out}$ at 10 volts. The circuit of comparator 133 provides a comparison voltage at the negative 10-volt level such that, when the output from logarithmic amplifier is below −10 volts, switch 135 will activate to disengage the output from logarithmic amplifier and actuate switch 135 to engage the other pole having a −10 Volt level in much the same fashion as discussed previously under the description for FIG. 3a. As shown in FIG. 3b, the threshold potentials can be either a plus or minus 10 volts (−10V and 10V), and the switches 134, 135 provide potentials at the alternate positions that are the same as the threshold potentials themselves, thereby effectively clamping $V_{out}$ to a range of between −10 volts and +10 volts. Comparators 132, 133 have inputs that are set to predetermined voltage levels that operate as thresholds that are not to be exceeded. If the level of $V_{out}$ reaches either of the thresholds, one of the comparators 133, 134 will produce a signal that toggles one of the switches 134, 135 and disengages the $V_{out}$ signal from the input to A/D converter 140.

Figure 5:
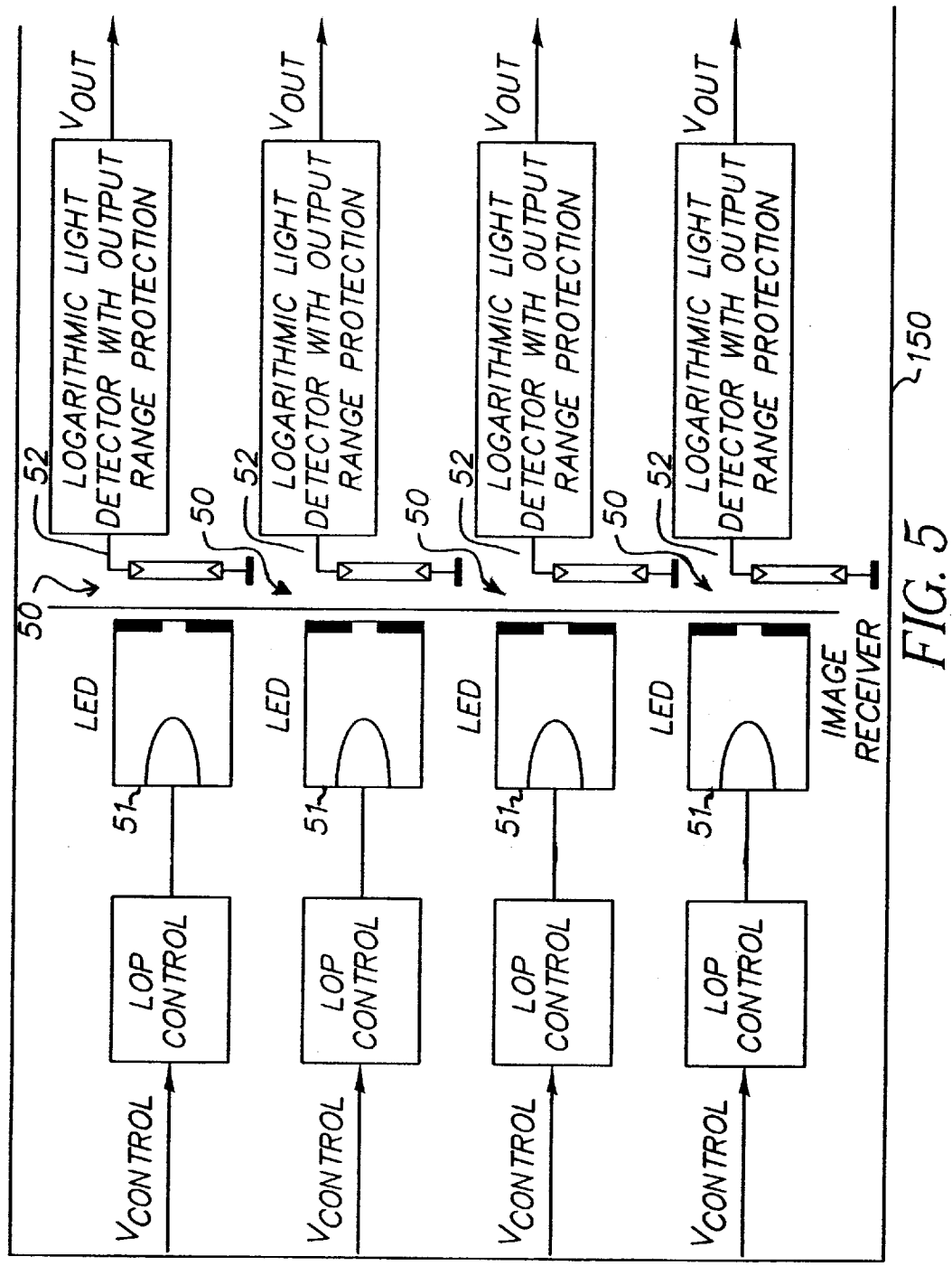
FIG. 5 is a block diagram of the first preferred embodiment of a multicolor system of the present invention.

Referring to FIG. 5, which is a diagram illustrating a preferred embodiment of the invention employing multiple densitometers 50 in a multicolor system 150. As shown in FIG. 5, a four-color densitometer system having channels with their functional units illustrated according to the present invention, as previously discussed. The circuitry for each of the four channels is identical and consistent with the previous descriptions according to the present invention. The only difference between the densitometers 50 is that each color channel provides illumination with an LED of a different wavelength. The densitometers 50 can be configured using any of the previously discussed configurations to form light-emitting sections 51 and light detecting sections 52. According to the present invention, similar $V_{out}$ signals are achieved in the light detector regardless of colorant used. With this, a reduction in manufacturing cost can be achieved without compromising the accuracy of the measurement by using one and the same detector in conjunction with four different light emitters. The four emitters together with their respective apertures are assembled in one unit facing one common detector element. Size of the detector area, spacing of light emitters to each other and distance between detector and emitters (in one assembly) are optimized together with apertures and light output settings. Such arrangement provides a compact and cost-optimized solution to colorant measurements even in compact desktop devices. The logic and control unit of such image processing apparatus processes and controls the signals to and from the device no different than in an arrangement using for each colorant a separate light emitter and its associated detector. The light emitter, in conjunction with the light detector according to this disclosure, is used in the image processing apparatus to provide on-line measurements of the colorants used in forming the image. Electrical signals such as $V_{out}$ proportional to the amount of colorant are processed by the logic and control unit to derive repeatedly and continuously control signals for the adjustment of the image formation and, thus, the printing process. In general, the more accurate the readings $V_{out}$ are, the more consistent the printing process can be controlled.

Figure 6:
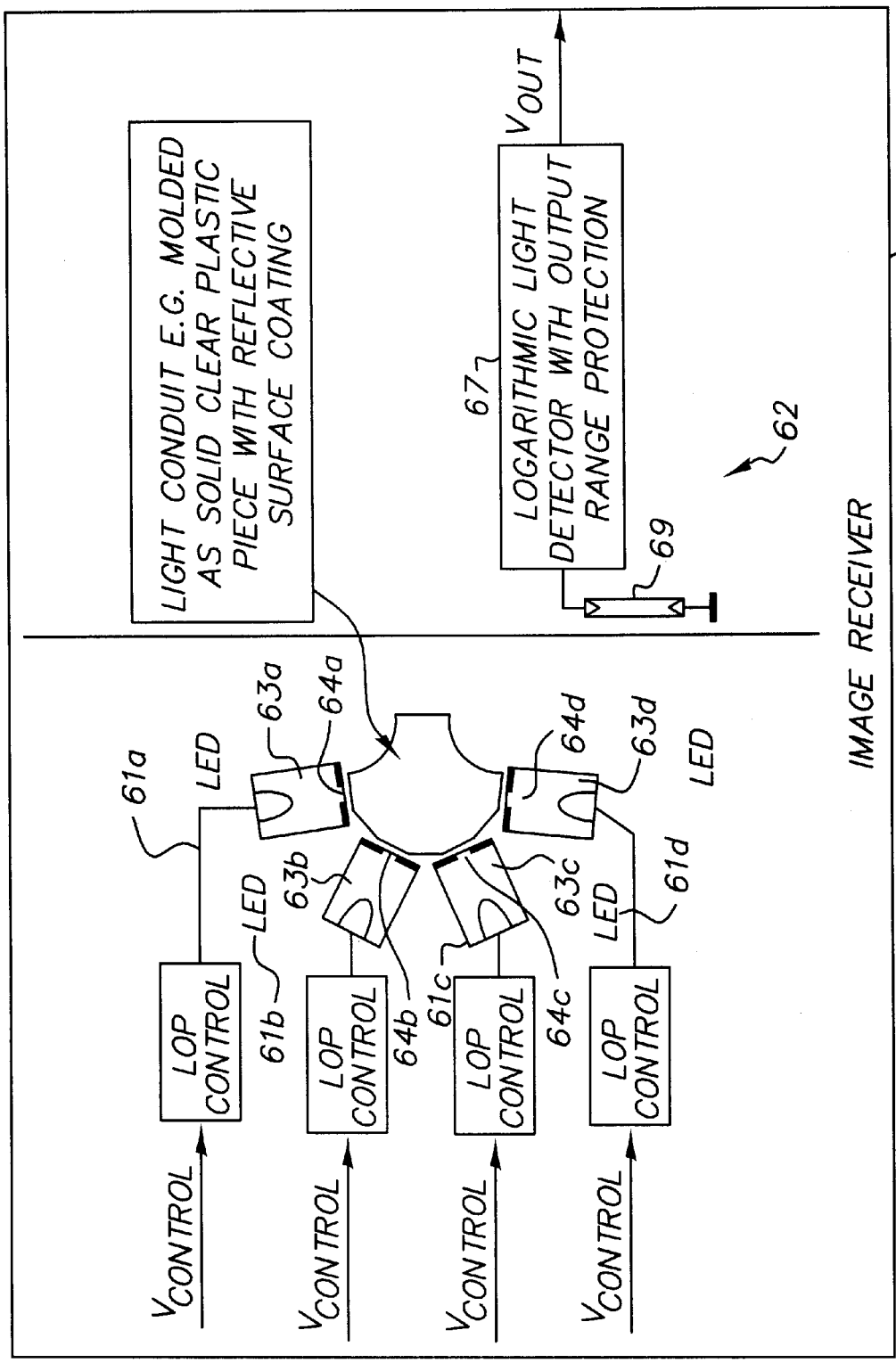
FIG. 6 is a block diagram of the second preferred embodiment of a multicolor system of the present invention.

Referring now to FIG. 6, a diagram preferred embodiment of the present invention comprising a four-color densitometer system 160 where the elements of the four-color channels are shown with their functional units according to the present invention. According to the disclosure, only one light detector 69 is used to detect the light from the four-color channels 61a, 61b, 61c and 61d. The four color channels 61a, 61b, 61c and 61d have four illumination LEDs 63a, 63b, 63c and 63d that provide each of the four color channels 61a, 61b, 61c and 61d with a different wavelength. The light from the four illumination LEDs 63a, 63b, 63c and 63d passes through apertures 64a, 64b, 64c and 64d, as discussed previously in accordance with the present invention. A light conduit 65 is positioned with respect to the four LEDs 63a, 63b, 63c and 63d such that it will be incident on the image receiver with the light detection area 69 of the light sensor positioned on the opposite side of the light conduit 65. Such light conduit might be molded as a solid piece of plastic with a reflective surface coating to limit light loss and/or employing the use of four fiber optic channels 63a, 63b, 63c and 63d. In this embodiment, only one the four illumination LEDs 63a, 63b, 63c and 63d will be on at a given time, allowing light detector 69 to generate signals for each of the four color channels 61a, 61b, 61c and 61d. In the operation of four illumination LEDs 63a, 63b, 63c and 63d with only one light detector 69 it is important that the selected LED is on when needed. The amount of time for an LED to illuminate can vary greatly with substrate temperature. Also, the light output can change significantly with substrate temperature. Therefore, it is desirable to have all four illumination LEDs 63a, 63b, 63c and 63d on when they are not being used and to turn off the three LEDs not selected when it is determined which of the four illumination LEDs 63a, 63b, 63c and 63d is selected. Another preferred manner of using the four illumination LEDs 63a, 63b, 63c and 63d is to place the LEDs into a standby mode that turns the four illumination LEDs 63a, 63b, 63c and 63d partially on, which heats the substrate, thereby greatly reducing the amount of time required to turn on one of the four illumination LEDs 63a, 63b, 63c and 63d. Generally, in Stand By mode, all the LEDs will be partially on, and the selected LED is switched completely on. The present invention provides for compact design alternatives using as few as two LEDs (such as green and blue) that results in a smaller and more cost effective system.

The preferred embodiments, as described above, provide the ability to achieve improved accuracy. The computer adjustment of the light output by means of automated control of the light emitter section allows repeated adjustments of the readings obtained without any colorant present. This is possible not only for the zero-density readings for all the colorants, but there is also the ability to measure the amount of colorants on various receivers such as papers and transparencies. Without any colorant present, the readings for $V_1$ (no colorant) are made in presence of the receiver only. The logic and control unit processes the readings $V_{out}$ such as to increase or decrease the light output by means of decreasing or increasing the control voltage to the light emitter. This adjustment procedure is applied conveniently whenever the image processing apparatus starts a production run. The correct timing for the measurements of $V_1$ and adjustments for control voltage are provided by the control program executed continuously in the logic and control unit.

Table 5 below provides a selection of light-emitting diodes that is actually a preferred replacement for the light-emitting diodes shown Table 2. The reason that the light-emitting diodes in Table 5 are preferred is because they are brighter than those shown in Table 2. The adjustment features, previously discussed, will provide a similar set of charts for the light-emitting diodes in Table 5, as was the case for the light-emitting diodes shown in Table 2.

TABLE 5

Preferred Light Emitting Diodes According to the present invention

| | | | |
|---|---|---|---|
| Infrared | QT Optoelectronics | F5D1 | 880 nm |
| Red | Hewlett Packard | HLMP-EG10 | 626 nm |
| Green | Nichia | NSPB500S-VQ | 540 nm |
| Blue | Nichia | NSPB500S-HR | 460 nm |

The preferred embodiments, as previously described, provide the ability for effective troubleshooting the function and accuracy of the device. Proper calibration of the device can easily be verified by alternating the light output between a high and a low value by alternately placing a high and low value for $V_{control}$. The high and the low values for $V_{control}$ are conveniently selected to cause a difference in $\Delta V = V_2 - V_1$ similar to the maximum amount of colorant. The selection is predetermined by the manufacturer and, thus, should always yield the same reading $\Delta V$. Such calibration and functional check of the device can, therefore, be done automatically at predetermined intervals. In the preferred embodiment, this functional check is (a) incorporated in the autosetup process executed by the image processing apparatus automatically, and (b) provided as stand-alone service routine as part of a trouble shooting procedure.

The present invention provides the previously discussed advantages within an output signal and is achieved for multiple color output channels using readily available parts. The circuit applied is common to each of the color channels and results in very similar signal characteristics independent of colorant. This leads to improved sensitivity and, thus, accuracy of the amount of colorant used in the image formation process as compared to prior art. An identical design is employed for the light detector for each colorant resulting in an overall simplified system design; an opportunity to save manufacturing costs by using one light detector common to all colorants; an automatic self-check of function and calibration of the device; a capability of measuring the amount of colorant on various receivers such as papers and transparencies; and enhanced service and diagnostic procedures.

It is another aspect of this invention that the light intensity regulation provided, according to the above, is used in the operation and calibration of this device. The methods described for operation of the device and calibration of the device are incorporated into the controller of the image processing apparatus. The seamless integration of these methods into software governing the print production mode and the service mode yield the desired consistency in print quality over an extended range of operating conditions.

The foregoing description recites the embodiments most preferred by the inventors. Obvious modification will be readily apparent to those skilled in the art. Accordingly, the scope of the present invention should be measured by the appended claims.

| Parts List |
| --- |
| 5. Densitometer |
| 10. light-emitting section |
| 12. light-emitting device |
| 14. aperture |
| 16. potentiometer |
| 18. amplier |
| 18a. control input |
| 20. light dection section |
| 22. logarithmic amplifier |
| 24. light detecting |
| 30. image receiver |
| 31. comparator |
| 34. switch |
| 40. analog-to-digital converter |
| 50. densitometer |
| 51. light-emitting section |
| 52. light-receiving section |
| 60. densitometer |
| 61a. color channel |
| 61b. color channel |
| 61c. color channel |
| 61d. color channel |
| 60. light-receiving section |
| 63a. LED |
| 63b. LED |
| 63c. LED |
| 63d. LED |
| 65. light conduit |
| 69. light detector |
| 110. light-emitting section |
| 116. amplifier |
| 118. amplifier |
| 118a. control input |
| 122. amplifier |
| 132. comparator |
| 133. comparator |
| 134. switch |
| 135. switch |
| 140. analog-to-digital converter |

What is claimed is:

1. A densitometer used in color image processing comprising:
    a light emitter having a variable aperture positioned on a first side of an image;
    a light detector positioned on a second side of the image to receive light that passes through the image;
    a variable control to the light emitter; and
    wherein, the variable aperture provides coarse adjustment of light emitted from the light emitter and the variable control provides fine adjustment of light emitted from the light emitter.

2. The densitometer of claim 1 further comprising at least one more densitometer wherein the light emitters to the densitometers are of at least two different wavelengths.

3. The densitometer of claim 2 comprising a light conduit positioned near the apertures for each of the light-emitting devices such that light from the light-emitting devices will be directed through the light conduit into the light detector, and the placing step further comprises placing only one light detector to receive light through the light conduit.

4. The densitometer of claim 3 wherein each of the light-emitting devices are active at different time periods.

5. The densitometer of claim 1 wherein the light emitter is an LED of a predetermined wavelength selected to maximize absorption by a colorant being sensed.

6. The densitometer of claim 5 wherein the predetermined wavelength is representative of a color that is complimentary to the colorant being sensed.

7. A color image processing apparatus using a plurality of the densitometers, as in claim 6, wherein each of the densitometers has an LED of a different wavelength.

8. The densitometer of claim 1 wherein the variable control is a current adjustment mechanism that operates by adjusting a potentiometer.

9. The densitometer of claim 1 wherein the variable control is an automated current adjustment mechanism.

10. A color image processing system having a plurality of densitometers, each of the densitometers comprising:
    a light emitter positioned near an aperture;
    a light detector positioned on an opposite side of the aperture to receive light from the light emitter; and
    an adjustment mechanism operatively coupled to the light emitter to adjust light amount from the light emitter;
    wherein the aperture is variable.

11. The color image processing system of claim 10 wherein, the variable aperture provides coarse adjustment of light emitted from the light emitter and the variable control provides fine adjustment of light emitted from the light emitter.

12. The color processing system of claim 10 wherein each of the light emitters is a different wavelength.

13. The color processing system of claim 10 wherein the adjustment mechanism for each of the light emitters is a potentiometer.

14. The color processing system of claim 10 wherein the adjustment mechanism for each of the light emitters is an automated adjustment mechanism.

15. The color image processing system of claim 10 further comprising a light conduit positioned near the apertures for each of the light-emitting devices such that light from the light-emitting devices will be directed through the light conduit into the light detector, and the placing step further comprises placing only one light detector to receive light through the light conduit.

16. The color image processing system of claim 15 wherein each of the light emitting devices are active at different time periods.

17. A method of using densitometers for color image processing comprising the steps of:
    providing a plurality of densitometers positioned near an aperture with each of the densitometers having a light emitter, such that there at least two different wavelengths employed within the plurality of densitometers,
    placing a light detector on an opposite side of the aperture to receive light from the light emitter, and
    adjusting each of the light emitters such that the light detector for that light emitter detects an amount of light that approaches a predetermined value that is the same for each of the light detectors.

18. The method of claim 17 wherein the adjusting step further comprises adjusting the apertures such that light received by the light detectors approaches a predetermined value that is substantially similar for each of the light detectors.

19. The method of claim 18 wherein the adjusting step further comprises adjusting the apertures as a coarse adjustment and adjusting the light emitters as a fine adjustment.

20. The method of claim 17 wherein the providing step further comprises providing an LED as the light emitter for each of the densitometers.

21. The method of claim 20 wherein the providing step further comprises providing the LED such that it has a wavelength that is of a complementary color to a color patch that is to be sensed by that particular densitometer.

22. The method of claim 17 wherein the adjusting step further comprises adjusting a potentiometer that is operatively coupled to the LED for each of the densitometers.

23. The method of claim 17 wherein the adjusting step further comprises adjusting an automated mechanism that is operatively coupled to the LED for of the densitometers.

24. The method of claim 17 wherein the providing step further comprises providing a light conduit near the apertures near each of the light emitting devices such that light from the light emitting devices will be directed through the light conduit into the light detector, and the placing step further comprises placing only one light detector to receive light through the light conduit.

25. The method of claim 24 wherein each of the light emitting devices are active at different time periods.

26. A method of densitometry for color image processing comprising the steps of:

providing a plurality of densitometers positioned near a first side of receiver element with each of the densitometers having a light emitter that will emit illumination that is incident on the receiver element, such that there are at least two different wavelengths of light emitted from the light emitters within the plurality of densitometers, and further providing an adjustment mechanism for each of the light emitters that controls illumination intensity from the light emitter, placing at least one light detector on a second side of the receiver element to receive light from the light emitter; and receiving light transmitted through from the light emitters through the receiver at the light detector.

27. The method of claim 26 wherein the step of placing further comprises placing one light detector for each of the light emitters.

28. The method of claim 26 wherein the step of placing further comprises placing only one light detector for all the light emitters.

29. The method of claim 26 wherein the providing step further comprises providing test areas comprising colors of a first color scheme.

30. The method claim 29 wherein the providing step further comprises providing the light emitters such that they will emit wavelengths that are a complementary color scheme to the first color scheme.

31. The method of claim 27 wherein the step of providing further comprises providing as an adjustment mechanism for each of the light emitters a potentiometer that controls illumination intensity from the light emitter.

32. The method of claim 31 wherein the step of providing further comprises providing as an adjustment mechanism for each of the light emitters a potentiometer that controls illumination intensity from the light emitter.

33. The method of claim 26 wherein the providing step further comprises providing at least one aperture as a control for the light emitter illumination directed towards the light detector.

34. The method of claim 33 wherein the providing step further comprises providing one aperture for each emitter.

35. The method of claim 33 wherein the step of providing further comprises:

a single aperture employed as the at least one aperture and the placing step further comprises placing a single light detector as the at least one light detector; and wherein a light conduit is provided and placed between the aperture and the light emitters such that light from the light emitting devices will be directed through the light conduit onto the light detector.

36. The method of claim 35 wherein each of the light emitting devices is active at a different time period.

37. The method of claim 35 further comprising the step of adjusting the apertures as a coarse adjustment and adjusting the light emitters as a fine adjustment.

* * * * *